United States Patent
Fremont

[15] 3,698,359
[45] Oct. 17, 1972

[54] FLOATING FISH ENCLOSURE

[72] Inventor: Howard J. Fremont, New York, N.Y.

[73] Assignee: Marine Protein Corporation, New York, N.Y.

[22] Filed: Dec. 21, 1970

[21] Appl. No.: 99,831

[52] U.S. Cl. .................................................119/3
[51] Int. Cl. ..............................................A01k 63/00
[58] Field of Search ...................119/3, 5; 43/55, 56

[56] References Cited

UNITED STATES PATENTS

| | | | |
|---|---|---|---|
| 471,501 | 3/1892 | Houston et al. | 119/3 |
| 68,871 | 9/1867 | Green | 119/3 |
| 2,739,410 | 3/1956 | Budnick | 43/55 |
| 3,573,934 | 4/1971 | Mitchell | 119/3 |

Primary Examiner—Hugh R. Chamblee
Attorney—Kenyon & Kenyon Reilly Carr & Chapin

[57] ABSTRACT

A floating enclosure for containing a closed volume of water for efficient fish raising. A closed membrane, forming the sides and bottom of the enclosure, is supported by a closed anchored chain of floats. Protective nets can be provided, inside and outside the enclosure, to enhance durability. Stiffener slats, insertable in pockets in the sides of the membrane, are provided. Catwalks across the enclosure may be included. The water quality within the enclosure is controlled by pumping in oxygenated and treated water. Gutters are provided at the periphery of the enclosure whereby displaced water exits therefrom. Nonreflective sectional tarps are provided to furnish surface protection to the enclosed body of water, and to utilize absorbed sunlight in heating the water.

18 Claims, 6 Drawing Figures

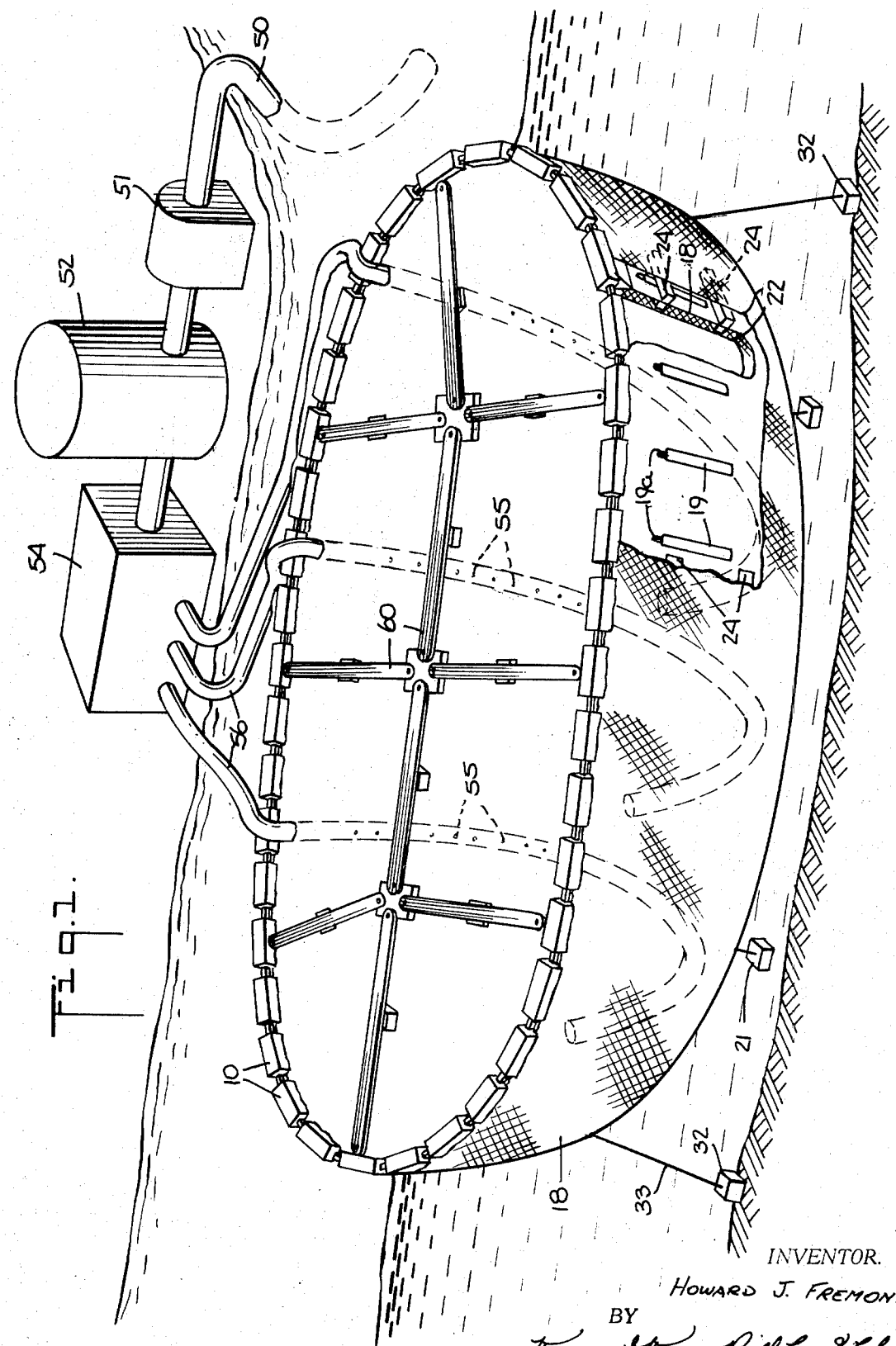

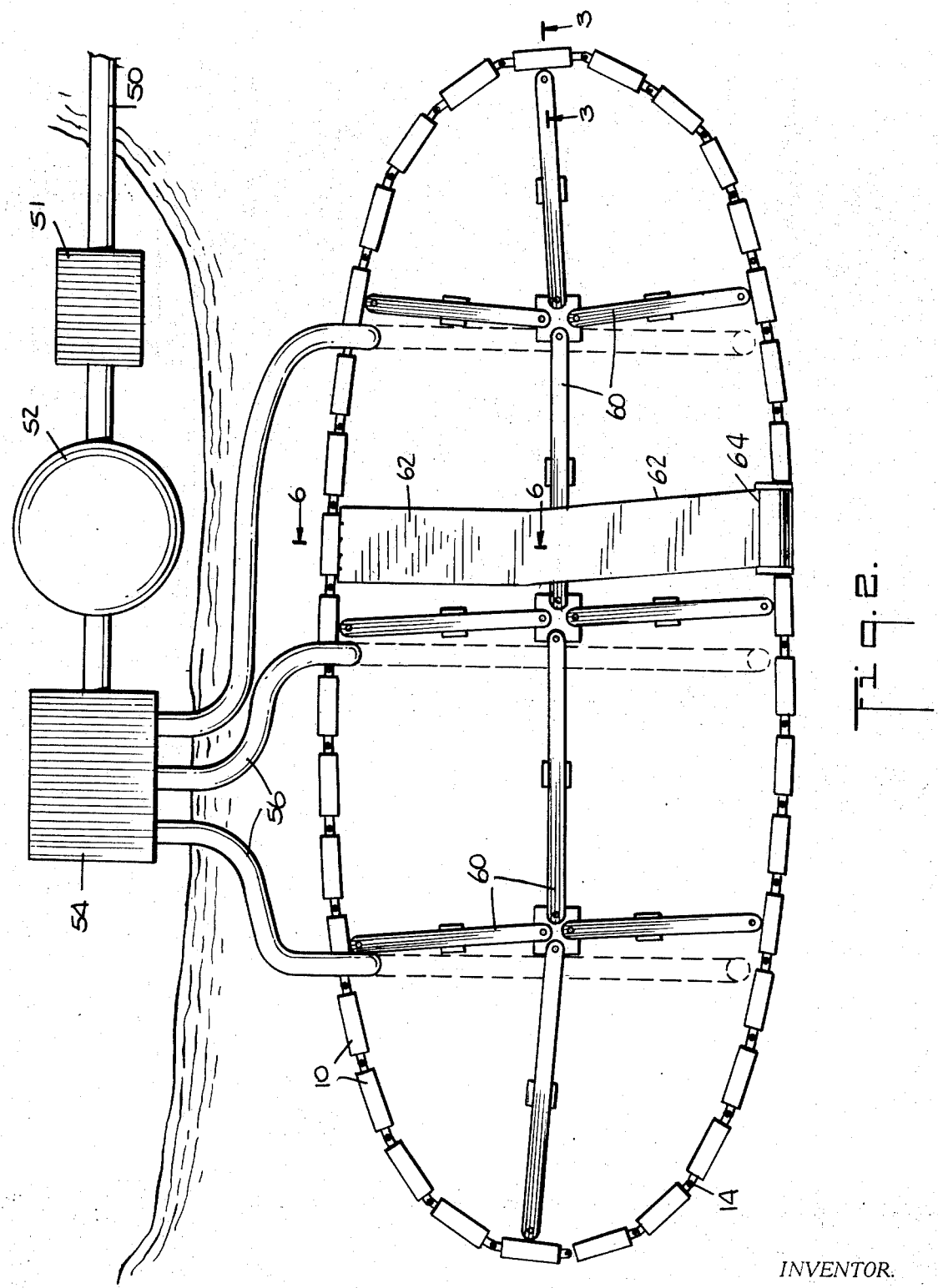

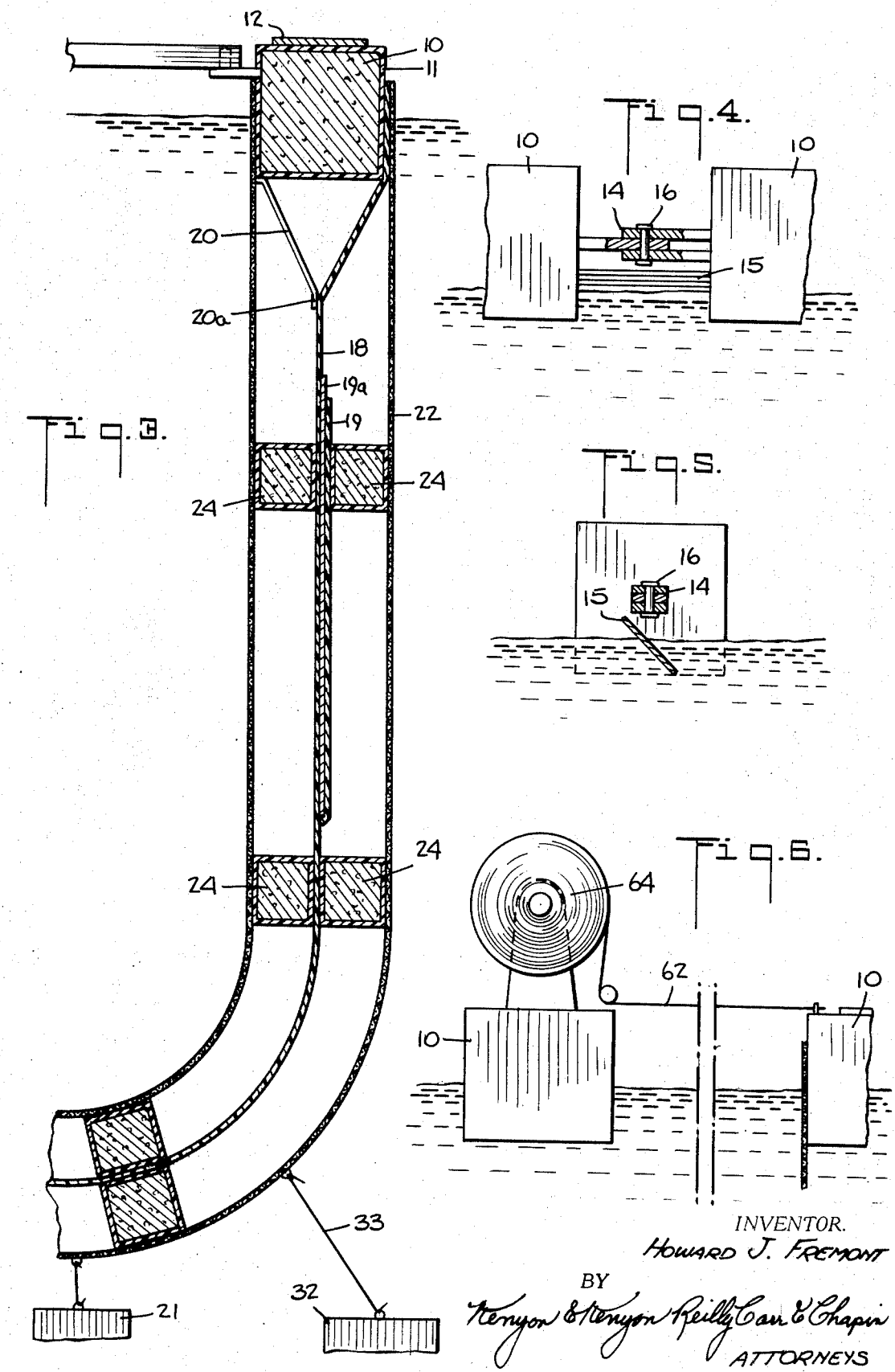

FLOATING FISH ENCLOSURE

FIELD OF THE INVENTION

This invention relates in general to the field of fish husbandry and more particularly to an economically feasible enclosure for providing a large body of water having a controllable environment conducive to the rapid growth of fish at high densities.

BACKGROUND OF THE INVENTION

There has been increasing interest recently in providing controlled environment structures and enclosures for containing fish to be grown at high densities and at maximum growth rates so as to provide an economically feasible alternative to previously known techniques of commercial fishing. Large silo-like aboveground tanks have been proposed in which water and oxygen are continuously circulated throughout the tank to provide an environment in which fish at very high densities can be grown. The cost of construction of such tanks requires that a very high density of fish be obtained in order to justify the cost of such tanks.

Another arrangement proposed is for a tank to be built into the ground with water and oxygen circulated throughout the tank to provide the required environment for rapid growth of healthy fish at very high densities. Again, cost considerations require that high fish densities be obtained in order to provide a product that is competitive at present market prices.

Pond culture of fish is a widely known technique that exposes fish to most, if not all, of the dangers faced by fish in a natural environment. Accordingly, known techniques of pond growth do not allow sufficiently high density of growing fish to provide the quantities of fish required to meet the growing need for fish products. The density of growth in ponds cannot be as great as in the highly controlled environment provided by the above-mentioned aboveground or underground tanks. However, pond culture does provide certain economic advantages in that available water resources can be employed without requiring a great deal of excavation or other construction.

It is a major purpose of this invention to provide an alternative to the controlled environment tank arrangement which will be considerably less expensive than the tank arrangement and yet will provide a high degree of environmental control.

It is another purpose of this invention to provide a controlled environment for raising fish which contains as many of the beneficial and natural aspects of a fish's natural environment as is possible while eliminating those aspects of its environment which reduce growth or limit the density of fish that can be grown.

It is a further purpose of this invention to provide a means for establishing a controlled environment for fish raising while allowing available water resources to be used for supply of the controlled region established by the enclosure.

SUMMARY OF THE INVENTION

This invention is for a floating immersed enclosure for establishing a closed volume of water in which a controlled environment conducive to raising fish can be provided. It includes a closed chain of floats, from which is suspended a large, bag-like closed liner filled with water. This apparatus is appropriately anchored in place. Nets are provided to protect the liner and spacers maintain the nets a distance away from the liner. Several means can be provided to maintain the liner in a desired shape. The spacers can be made of buoyant materials, to aid in support of the bottom of the liner. Pockets can be placed in the sides of the liner, into which stiffener slats can be inserted. Weights can be suspended beneath the liner to aid in shaping.

Separate water treatment facilities provide an input of fresh water which is pumped into the enclosure, the water thereby displaced leaving by means of gutters between the floats.

Catwalks across the enclosure give access for feeding fish and cleaning the region within the enclosure.

Section tarps can also be provided for selectively covering the surface of the enclosure. These tarps may be of any nonreflective material, to allow sunlight to heat the water, even while the enclosure is covered.

BRIEF DESCRIPTION OF THE DRAWINGS

FIG. 1 is a perspective view of the fish enclosure, showing its sides broken away and the support equipment associated therewith.

FIG. 2 is a top view of the enclosure.

FIG. 3 is a side section view of the wall of the fish enclosure.

FIG. 4 is a side view of two sections of the float chain of the invention showing the linkage therebetween.

FIG. 5 is an end view of a float segment, showing the gutter element of the float.

FIG. 6 is an end view of the sectional tarp used to cover the fish enclosure.

DESCRIPTION OF THE PREFERRED EMBODIMENTS

As shown in the figures, there is included a chain system of large floats 10 to which the enclosure is attached and which support it in the water. A suitable length for each float is about 10 to 25 feet and a suitable cross section is approximately 4 feet wide by 4 feet deep. The floats 10 are made of a highly buoyant non-corrosive material having a low water absorptivity characteristic. Polyurethane foam is one example of such material. Each float 10 is covered with a waterproof glass fiber skin 11, and the top surface of each float bears a non-slip surface 12 enabling a man to walk thereon. The floats 10 are joined in a long, flexible chain at joints 14 which are locked together by bolts 16. The area defined by the chain is about 250 feet in length and 100 feet in width.

Between each pair of floats 10 is a gutter 15 which comprises a flange of non-corrosive flexible material attached between the ends of the floats. This flange is inclined upwardly and outwardly, and extends slightly above the surface of the water when the enclosure is floating at its normal depth. This gutter enables water to splash outwardly over the sides of the enclosure, but, due to its inclination, permits very little water to enter the enclosure from the outside. This feature allows water entering the enclosure to displace outwardly water already inside the enclosure eliminating the need for outlet pumps or pipes.

A bag-like water-impermeable liner 18, about 20 feet in depth, is supported by the chain of floats 10. One arrangement for providing such support would be to have the liner 18 wrapped around the floats 10 and be sealed to itself on the underside of each float 10, while providing liner 18 with interruptions between the floats 10 above the water's surface, to allow gutters 15 to exit displaced water. Another means, as shown in the figures, is to seal the liner 18 to one side of the skin 11 and to provide a separate attachment 20 that is sealed at juncture 20a to the liner 18 and that is then sealed, or otherwise connected, to the other side of the floats 10, again leaving suitable interruptions of liner 18 and attachment 20. This attachment 20 may be made of the same material as is the liner 18 in order to facilitate heat sealing of the attachment 20 to liner 18. The liner 18 can conveniently be made of plastic heat-sealable material such as polyethylene or polypropylene. The precise material to be preferred may depend upon the dimensions of the enclosure and the conditions to which the material is to be exposed.

On either or both of the inside and outside of the liner 18 there may be disposed a net 22. The nets 22 can be composed of nylon netting or some other flexible non-corrosive material. The function of the nets 22 is to prevent abrasion or damage to the liner 18 by keeping fish and foreign objects from contact with the liner 18. In order to achieve this function, it is of some importance that the nets 22 be spaced from the liner 18. Accordingly, secondary floats 24 are attached at intervals to the side of each net that faces the liner 18. These secondary floats 24 which are entirely immersed in the water also aid in supporting the netting 22, and assist in providing proper shaping to liner 18. The secondary floats 24 however, are preferably not attached to the liner 18.

Liner 18 is provided with elongated vertical pockets 19 in the sides thereof. The pockets may be provided by heat-sealing long portions of liner material to the liner itself, leaving one end of the pocket open. Slats 19a may be inserted into pockets 19 to provide stiffening and shaping to the sides of liner 18. Slats 19a can be easily removed from pockets 19 if it is desirable to knock down this enclosure for compact storage or transport.

Additional means for shaping liner 18 can be provided by attaching weights 21 to the outer element of net 22. The shaping of liner 18 can thus be determined to a great degree by the placement of weights 21.

Anchor means can be provided to maintain the enclosure in a stationary position. Such means may comprise several underwater anchors 32, fastened to floats 10 or nets 22 by cables 33. Alternately, shore-based anchors can be provided, where feasible. In either case, care should be taken that cables 33 are sufficiently long to permit the enclosure to rise and fall with tides, waves, or other changes in water level or conditions.

With reference to FIG. 1, facilities for providing the enclosure with an input of treated water are provided. This equipment may be either shore-based, or it can be positioned on a service barge anchored near the enclosure. An intake pipe 50 and pump 51 are provided to draw water from the area surrounding the floating enclosure into the treatment apparatus. This apparatus can include a tank 52 with associated apparatus for regulating temperature of water passing therethrough. Connected in series with tank 52 may be a water oxygenator 54, which can regulate the amount of oxygen in the water to be furnished to the enclosure. Other water treatment equipment, such as filters on chemical injectors, can also obviously be employed. Input pipes 56 extend from the oxygenator unit to carry input water to the bottom of the enclosure, where it is released through holes 55. The treated water thus introduced displaces water near the surface in the enclosure and this water exits via gutters 15. This arrangement eliminates the need for specialized equipment to remove exhausted water from the enclosure.

It is contemplated that in certain situations, such as extremely rough water, gutters 15 may be ineffective in keeping water from splashing into the enclosure. In such cases, gutters 15 can be replaced by higher barriers, and conventional tubing and pump apparatus can be used, in lieu of the gutters, to remove water from the enclosure.

It is clear that the water pumped into the enclosure may conveniently be obtained from the larger body of water surrounding the enclosure. Similarly, the water leaving the enclosure is returned to the body of water outside, making dispersal easy. In this fashion, a ready supply of water having properties favorable to the growth of fish is made available. At the same time, predators and competitors for food are kept out of the sanctuary provided by the enclosure.

In connection with the deployment of the input pipes for pumping water into the enclosures, it should be kept in mind that it is desired to maintain a circulation of fresh water throughout the enclosure so that the entire interior region maintains optimum conditions for growing fish and so that there will be a minimum of stagnant areas. The exact placement of the pipes will depend upon the configuration of the liner 18 and will be such as to assure desirable circulation of water throughout the enclosure.

It is useful to include with this enclosure a system of catwalks 60 which extend across the surface of the water within the enclosure. These catwalks can be fastened at their ends to floats 10, and additional flotation can be provided at intermediate points along their lengths, if needed. Catwalks 60 allow access to the entire area of the enclosure for feeding fish, or cleaning or repair of the enclosure.

It is also beneficial to provide the enclosure with means for selectively covering the top surface thereof. Such means can include several sectional tarps 62, which may be stored on large rollers 64 mounted on floats 10. Tarps 62 can thus be unrolled, when desired, to add a protective cover to the enclosure, and fastened by conventional means to the opposite floats. Tarps 62 are useful not only to provide protection from the elements, but also to selectively provide a semi-dark environment, in which many species of fish thrive because of the apparent security thereby given. On the other hand, if the tarps are used solely for protection, it is useful to make them of a non-reflective material such as dark colored or translucent sheeting so that sunlight can be used to heat the water enclosed, even though the enclosure is covered.

The density of fish that may be maintained under the conditions made possible by this invention will be substantially greater than could be maintained under any known technique of pond culture. This invention makes possible, in the right locations, the growing of fish under controlled conditions at relatively high densities in much larger volumes of water than are provided by known techniques of tank culture and furthermore makes all this possible at a reasonable cost. Accordingly, this invention achieves its purpose which is to provide many of the benefits of the natural environment for the growth of fish and yet to control that environment so as to enable maintainance of a high density of growing fish in a sufficiently economical fashion to provide large quantities of fish at a marketable cost.

A variant on this embodiment which applicant believes useful is to make the liner 18 with a bottom of fine mesh. The mesh bottom may be of any non-corrosive flexible filamentary material. The purpose of the permeable bottom is to provide additional water transfer into the enclosure, where desired, while still securely enclosing the fish in the protected region. Moreover, such a permeable bottom will allow fish offal, which is generally more dense than water, to sink downward through the mesh and out of the enclosure, reducing the necessity for cleaning the enclosure and the water therein.

It should be appreciated that the embodiments disclosed in this specification are intended to be illustrative only, and that one skilled in the art could modify these embodiments without departing from the scope of this invention.

What is claimed is:

1. A floating fish enclosure for establishing a closed volume of water to provide a controlled environment conducive to fish raising comprising:
   a. a float system comprising floats;
   b. a water-impermeable flexible liner having sides and a bottom, connected at its periphery to said float system; and
   c. inclined gutters connected between the floats of said float system to allow easy passage of water outwardly from the interior of said liner, but substantially precluding entry of water into said liner from the outside thereof.

2. The apparatus of claim 1, having means comprising anchors for holding said apparatus in a relatively stationary position when said apparatus is afloat.

3. The apparatus of claim 1, in which said liner has a plurality of elongated pockets in the sides thereof, and including further slats insertable into said pockets to aid in maintaining the shape of said liner.

4. The apparatus of claim 1, having a protective net disposed in proximity to at least one of the inside and outside surfaces of said liner, said net being attached to said float system.

5. The apparatus of claim 4, having spacers connected to said net to space said net from said liner.

6. The apparatus of claim 5, in which said liner has a plurality of elongated pockets in the sides thereof, and including further slats insertable into said pockets to aid in maintaining the shape of said liner.

7. The apparatus of claim 6, having:
   a. roller means mounted on said floats;
   b. sectional tarps mounted on said roller means so as to be unrollable across said enclosure; and
   c. means to fasten said tarps to maintain them in their unrolled disposition across said enclosure.

8. The apparatus of claim 7, having a system of catwalks attached to said floats and extending across said enclosure.

9. The apparatus of claim 8, having:
   a. water treatment means associated therewith;
   b. intake means to draw water from outside said enclosure into said treatment means; and
   c. output means to introduce water from said treatment means into said enclosure.

10. The apparatus of claim 1, having:
    a. roller means mounted on said floats;
    b. sectional tarps mounted on said roller means so as to be unrollable across said enclosure; and
    c. means to fasten said tarps to maintain them in their unrolled disposition across said enclosure.

11. The apparatus of claim 1, having a system of catwalks attached to said floats and extending across said enclosure.

12. The apparatus of claim 1, having:
    a. water treatment means associated therewith;
    b. intake means to draw water from outside said enclosure into said treatment means; and
    c. output means to introduce water from said treatment means into said enclosure.

13. A floating fish enclosure for establishing an enclosed volume of water to provide a controlled environment conducive to fish raising comprising:
    a. a float system comprising floats;
    b. a liner having water-impermeable flexible sides and a water-permeable mesh bottom, said liner connected at its periphery to said float system; and
    c. inclined gutters connected between the floats of said float system to allow easy passage of water outwardly from the interior of said liner, but substantially precluding entry of water into said liner from the outside thereof.

14. A floating fish enclosure for establishing a closed volume of water to provide a controlled environment conducive to fish raising comprising:
    a. a float system comprising a plurality of floats;
    b. a water-impermeable flexible liner having sides and a bottom, said flexible liner being connected to said float system;
    c. inclined gutters connected between the floats of said float system to allow easy passage of water outwardly from the interior of the volume defined by said liner, but substantially precluding entry of water into said defined volume from the outside thereof; and
    d. a protective net disposed in proximity to at least one of the inside and outside surfaces of said liner, said net being attached to said float system.

15. The apparatus of claim 14, having spacers connected to said net to space said net from said liner.

16. The apparatus of claim 15, in which said liner has a plurality of elongated pockets, and further including slats which are insertable into said pockets to aid in maintaining the shape of said liner.

17. The apparatus of claim 16, further comprising:
    a. roller means mounted on said floats;
    b. sectional tarps mounted on said roller means so as to be unrollable across said enclosure; and
    c. means to fasten said tarps to maintain them in their unrolled disposition across said enclosure.

18. The apparatus of claim 17, further comprising a system of catwalks attached to said floats and extending across said enclosure.

19. The apparatus of claim 18, further comprising:
a. water treatment means associated therewith;
b. intake means to draw water from outside said enclosure through said treatment means; and
c. output means to introduce water from said treatment means into said enclosure.

* * * * *